US008505006B1
US008505006B1

(12) United States Patent
Larkin et al.

(10) Patent No.: US 8,505,006 B1
(45) Date of Patent: Aug. 6, 2013

(54) RESOURCE MANAGEMENT IN VIRTUAL MACHINES USING DYNAMIC TABLE FOR PERFORMING RESOURCE QUERIES

(75) Inventors: Michael K. Larkin, Mountain View, CA (US); Kiran Kamity, Mountain View, CA (US); Shanmuga Appajodu, Mountain View, CA (US)

(73) Assignee: Ringcube Technologies, Inc., Fort Lauderdale, FL (US)

( * ) Notice: Subject to any disclaimer, the term of this patent is extended or adjusted under 35 U.S.C. 154(b) by 1677 days.

(21) Appl. No.: 11/525,888

(22) Filed: Sep. 22, 2006

Related U.S. Application Data

(60) Provisional application No. 60/811,582, filed on Jun. 6, 2006, provisional application No. 60/811,591, filed on Jun. 6, 2006, provisional application No. 60/811,572, filed on Jun. 6, 2006, provisional application No. 60/771,998, filed on Feb. 10, 2006, provisional application No. 60/772,000, filed on Feb. 10, 2006, provisional application No. 60/772,001, filed on Feb. 10, 2006, provisional application No. 60/772,002, filed on Feb. 10, 2006.

(51) Int. Cl.
*G06F 9/455* (2006.01)
*G06F 9/46* (2006.01)

(52) U.S. Cl.
USPC .............................................. 718/1; 718/104

(58) Field of Classification Search
None
See application file for complete search history.

(56) References Cited

U.S. PATENT DOCUMENTS

| | | | |
|---|---|---|---|
| 6,947,965 B2 | 9/2005 | Glass | |
| 6,970,866 B1 | 11/2005 | Pravetz et al. | |
| 7,320,024 B2 | 1/2008 | Oku | |
| 7,356,679 B1 | 4/2008 | Le et al. | |
| 7,424,709 B2 | 9/2008 | Neiger et al. | |
| 7,865,893 B1 * | 1/2011 | Omelyanchuk et al. | 718/1 |
| 2002/0010756 A1 | 1/2002 | Oku | |
| 2002/0147810 A1 | 10/2002 | Traversat et al. | |
| 2003/0028612 A1 | 2/2003 | Lin et al. | |
| 2003/0054810 A1 | 3/2003 | Chen et al. | |
| 2004/0179537 A1 | 9/2004 | Boyd et al. | |
| 2005/0004968 A1 | 1/2005 | Mononen et al. | |
| 2005/0021695 A1 | 1/2005 | Takamine | |
| 2005/0021788 A1 | 1/2005 | Tucker et al. | |
| 2005/0114448 A1 | 5/2005 | Skomra | |
| 2005/0114586 A1 * | 5/2005 | Brice et al. | 711/1 |
| 2005/0246453 A1 * | 11/2005 | Erlingsson et al. | 710/1 |
| 2005/0289216 A1 | 12/2005 | Myka et al. | |
| 2006/0021029 A1 * | 1/2006 | Brickell et al. | 726/22 |
| 2006/0155931 A1 | 7/2006 | Birrell et al. | |
| 2007/0050770 A1 | 3/2007 | Geisinger | |
| 2009/0025006 A1 | 1/2009 | Waldspurger | |

OTHER PUBLICATIONS

U.S. Appl. No. 11/525,726, Michael K. Larkin, Hot Pluggable Virtual Machine, filed Sep. 22, 2006.

(Continued)

*Primary Examiner* — Meng An
*Assistant Examiner* — Eric C Wai
(74) *Attorney, Agent, or Firm* — Banner & Witcoff, Ltd.

(57) ABSTRACT

Systems and methods are provided for intelligent resource management for a virtual machine. A method for operating a virtual environment can comprise receiving a request for a resource from an application, processing the request to identify the resource, determining whether the resource is for the virtual environment, and modifying a part of a data structure for the request based on a reference to the resource in the virtual environment.

18 Claims, 6 Drawing Sheets

OTHER PUBLICATIONS

U.S. Appl. No. 12/002,725, Shanmuga Appajodu, Systems and Methods for Decentralized Computing, filed Dec. 17, 2007.

U.S. Appl. No. 11/516,179, Aaron Slettehaugh, System and Method of Providing Mobility to Personal Computers, filed Sep. 5, 2006.

Sapuntzakis, S.P. et al., "Optimizing the Migration of Virtual Computers," 2002, ACM SIGOPS Operating Systems Review, vol. 36, pp. 377-390.

* cited by examiner

RESOURCE MANAGEMENT IN VIRTUAL MACHINES USING DYNAMIC TABLE FOR PERFORMING RESOURCE QUERIES

CROSS-REFERENCE AND RELATED APPLICATIONS

This U.S. nonprovisional patent application claims the benefit of U.S. Provisional Patent Application Ser. No. 60/811,582, filed on Jun. 6, 2006, entitled "Systems and Methods for a Hot Pluggable Virtual Machine," U.S. Provisional Patent Application No. 60/811,591, filed on Jun. 6, 2006, entitled "Intelligent Resource Management for a Virtual Machine," U.S. Provisional Patent Application No. 60/811,572, filed on Jun. 6, 2006, entitled "Intelligent Resource Management using a Dynamic Table for a Virtual Machine," U.S. Provisional Patent Application No. 60/771,998, filed on Feb. 10, 2006, entitled "Dynamic Table System," U.S. Provisional Patent Application No. 60/772,000, filed on Feb. 10, 2006, entitled "System and Method For Virtualizing An Operating System," U.S. Provisional Patent Application No. 60/772,001, filed on Feb. 10, 2006, entitled "Hot Pluggable/Transportable Virtual Environment," and U.S. Provisional Patent Application No. 60/772,002, filed on Feb. 10, 2006, entitled "Intelligent Resource Management for a Virtual Machine", which are all incorporated herein.

The present application is related to U.S. Nonprovisional patent application Ser. No. 11/525,726, filed on Sep. 22, 2006, entitled "Hot Pluggable Virtual Machine," and U.S. Nonprovisional patent application Ser. No. 11/525,727, filed on Sep. 22, 2006, entitled "Dynamic Table Configuration in a Virtual Machine," which are also incorporated herein.

BACKGROUND OF THE INVENTION

1. Field of the Invention

The present invention relates generally to virtual machines, and more particularly to intelligent resource management for a virtual machine.

2. Description of Related Art

Virtual machines (VMs) allow a computer to simultaneously support and execute two or more computing environments. A computer environment comprises the operating system as well as user applications and data. A VM is configured to borrow computing resources such as CPU, disk, and memory from a host computer, and co-exist alongside the host computer as a guest computer.

Due to a large software footprint, current VMs can not be easily transported from one host computer to another host computer. To be portable, the VM requires the capability to adapt to any given host environment and reconfigure its resources based on the presence or absence of hardware or operating system resources on the host system. Additionally, the resources on the guest computer must remain isolated from the resources on the host computer, and vice-versa.

When a VM accesses operating system resources on the host computer, the host computer isolates certain operating system resources such as the file system, registry, kernel objects and services from the guest computer. As such, there exists a need to determine whether to access operating system resources within the host computer or operating system resources within the guest computer to maintain isolation between the host computer and the guest computer.

One technique to accomplish this goal to is maintain two separate operating systems with two sets of system files thereby allowing the virtual machine to operate independently. Unfortunately, the additional files grow as new applications are installed on the virtual machine. Further, duplicate and redundant files may ultimately be stored and maintained on both the virtual machine and host computer. As a result, the supporting files and related hardware requirements may be burdensome to the host computer and performance may slow. Further, the size of the files and necessity for hardware storage may become a burden in porting the virtual machine from one host computer to another.

SUMMARY OF THE INVENTION

Systems and methods are provided for intelligent resource management for a virtual machine. A method for operating a virtual environment can comprise receiving a request for a resource from an application, processing the request to identify the resource, determining whether the resource is for the virtual environment, and modifying a part of a data structure for the request based on a reference to the resource in the virtual environment.

The request for a resource may comprise an invocation to an application programming interface (API). Determining whether the resource is for the virtual environment can comprise identifying the resource and the virtual environment with a table. The method may further comprise updating the table with the reference to the resource.

Determining whether the resource is for the virtual environment can also comprise identifying the resource and the virtual environment using a rule. Modifying the part of the data structure for the request based on the reference to the resource in the virtual environment can comprise modifying an object name of the resource. The method may further comprise allowing the request to proceed to an operating system.

A software product for operating a virtual environment can comprise software operational when executed by a processor to direct the processor to receive a request for a resource from an application, process the request to identify the resource, determine whether the resource is for the virtual environment, and modify a part of a data structure for the request based on a reference to the resource in the virtual environment, and a storage medium configured to store the software.

A system for operating a virtual environment can comprise a memory and a processor. The memory may be configured to store data. The processor may be configured to receive a request for a resource from an application, process the request to identify the resource, determine whether the resource is for the virtual environment, and modify a part of a data structure for the request based on a reference to the resource in the virtual environment.

DETAILED DESCRIPTION OF THE INVENTION

Figure 1:
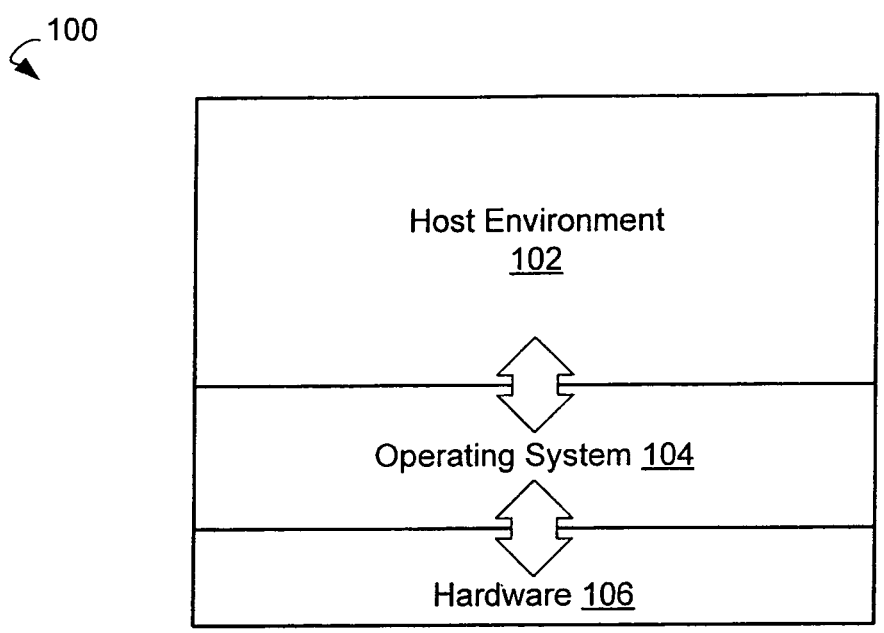
FIG. 1 is an illustration of a host system for hosting a virtual machine in an exemplary implementation of the invention.

The embodiments discussed herein are illustrative of one example of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, these descriptions and drawings should not be considered in a limiting sense, as it is understood that the present invention is in no way limited to only the embodiments illustrated.

A system for managing resources in a virtual machine includes a guest memory, a host memory, and a processor. The guest memory is a memory associated with a guest computer or guest virtual environment comprising guest resources. The guest resources include files such as applications, data files, registry entries, and kernel objects that are stored within the guest memory. The host memory is a memory associated with a host computer for storing host resources including, for example, applications, registry entries, and kernel objects.

The virtual machine can execute a guest environment that is a separate virtual environment from the host environment. In one example, the guest environment appears to be a separate operating system from the operating system of the host environment. In exemplary embodiments, the host environment and the guest environment may be run concurrently with no appreciable change in performance. The applications within the guest environment may be completely isolated from the applications within the host environment.

Requests regarding resources (i.e., resource requests) between the operating system of the host computer and the host or guest environments may be intercepted. If the resource request is determined to be for or concerning the guest environment, the data structure of the resource request may be modified before allowing the resource request to continue to the original destination.

In one example, a resource request (e.g., invocation to an application programming interface) is sent from an application running in the guest environment to the host computer's operating system. The resource request is intercepted and it is determined that the desired request is not in the host memory but rather in the guest memory. The resource request is modified (e.g., the name of the resource altered to identify the location of the desired resource as within the guest memory) and then the modified request is allowed to pass to the operating system. By processing and modifying the resource query as needed the system can advantageously operate a virtual machine in a host computer using operating system resources installed in the host computer.

One advantage that may be afforded by this approach to virtualization is that host applications and data are kept isolated from guest applications and data, so that a software crash, virus, or data corruption in one guest environment cannot propagate to the host environment, nor to another guest environment.

FIG. 1 is an illustration of a host system 100 for hosting a virtual machine according to one implementation of the invention. The host system 100 comprises a host environment 102, an operating system 104, and hardware 106. The host environment 102 receives instruction from and transmits instructions to the operating system 104. The operating system 104 receives data and transmits instructions to the hardware 106.

The host environment 102 comprises, for example, user applications and data files stored within a host memory. The host environment 102 may further access, for example, library files, configuration files, registries and/or or kernel objects. The operating system 104 comprises, for example, Windows® or Linux®. The hardware 106 includes hardware resources such as ports, processors, memory, and input/output devices including, for example, a display, speakers, printers, a keyboard, and/or a mouse. In operation, a user may operate the host system 100 as if the host system 100 is a personal computer without a virtual machine. The host environment 102 may be substantially unaffected by the presence of a virtual machine.

Figure 2:
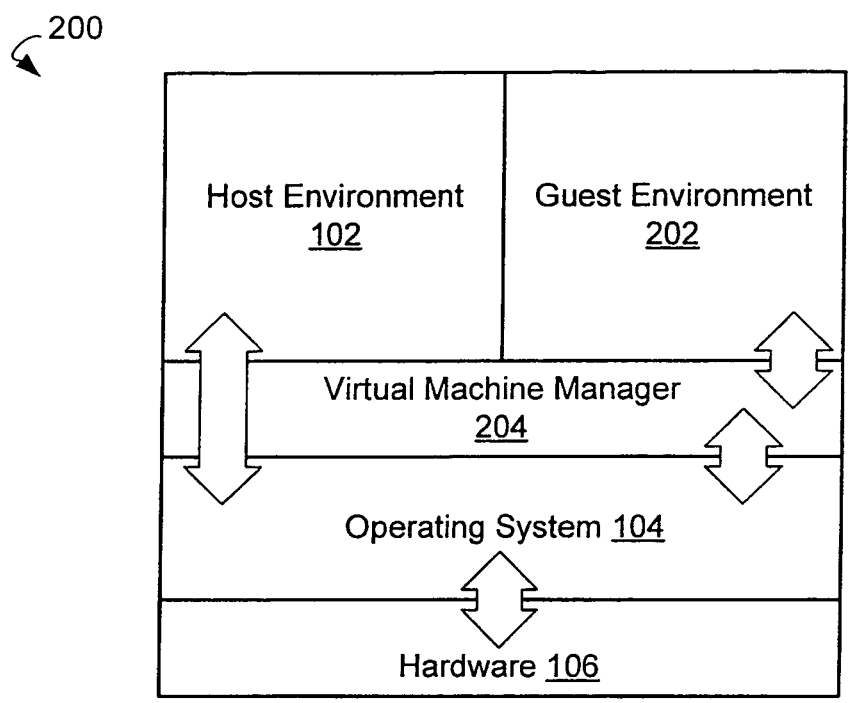
FIG. 2 is an illustration of a host computer comprising a virtual machine in an exemplary implementation of the invention.

FIG. 2 is an illustration of a host computer 200 comprising a virtual machine according to an exemplary implementation of the invention. The host computer 200 uses the operating system 104 and the hardware 106 of host computer 200 to execute applications within a portable guest environment. The host computer 200 may comprise the host environment 102, the operating system 104, the hardware 106, a guest environment 202, and a virtual machine manager 204. The guest environment 202 receives instructions from and transmits instructions to the virtual machine manager 204. The virtual machine manager 204 is executed by the processor (further discussed in FIG. 3) and interrupts instructions from and transmits instructions to the operating system 104.

The guest environment 202 comprises files specific to the virtual machine. Files (i.e., resources) within the guest environment 202 may comprise application files, data files, registry files, library files, configuration files, kernel objects, and/or cookies.

The virtual machine manager 204 mediates requests for resources from applications, determining whether the requests are to be passed through to the host environment 102 or maintained within the guest environment 202. Other configurations also within the scope of the invention, for example, include multiple virtual machine managers 204.

In some embodiments, if the requested resource is for a guest environment 202, the virtual machine manager 204 performs namespace virtualization to modify the data structure to indicate that the resource is part of the guest environment 202. Namespace virtualization is the technique of renaming resources in order to direct the operating system 104 to the desired resource or lead to the desired effect. Namespace virtualization may comprise converting the value of an object-name from its value in a host environment 102 into a new value specific to a guest environment 202.

In an exemplary embodiment, the virtual machine manager 204 intercepts resource requests such as invocations to application program interfaces and identifies the resources from within a data structure of the resource request.

The resource request comprises the data structure which indicates the information associated with the resource request including, but not limited to, an object-name, an object-type, a resource-action-request, and an output-location. The object-name may identify the name of the resource as well as the location of the resource. The object-type identifies the type of resource identified by the object-name. The resource-action-request is the action to be performed (e.g., read, write.) The output-location is the location where the output from the resource-action-request.

The virtual machine manager 204 may determine if the resource is for the guest environment 202. If the resource is for the guest environment, the virtual machine manager 204 may perform namespace virtualization on the data structure.

In one example, a data structure for a request for a write to a sound card port may include the following associations:

object-name:"\SoundPort", object-type:port, resource-action-request:write, and output-location:n/a. The virtual machine manager 204 may determine that this request should be handled by a guest operating system in a virtual environment. Then, the virtual machine manager 204 would perform namespace virtualization by modifying the object-name from "\SoundPort" to "\Virtualized\SoundPort". This change to the object-attributes data structure may indicates that the requested resource is now part of the guest environment 202. Subsequent requests for the resource named, "\Soundport" may be automatically redirected to the guest environment 202.

Operating systems 104 or the virtual machine manager 204 may use many different ways of naming various resources. Namespace virtualization is not limited to any particular operating system 104 or naming technique. Those skilled in the art will appreciate that many types of naming techniques are within the scope of various embodiments. Once namespace virtualization has been performed for a particular request, the virtual machine manager 204 pass the modified request to the operating system 104.

In various embodiments, the virtual machine manager described can dynamically track and catalog operating system resource usage, allowing some resource requests to pass through to the host environment, while modifying the data structures of other resource requests so that the operating system maintains them in a guest environment. This tracking and cataloguing of resources can be used to enforce policy-based guest environments. Because the virtual machine manager may operate at the level of the host operating system, it may have a small software footprint on the host computer.

In an exemplary embodiment, the virtual machine manager maintains a list of operating system resources, and upon each resource request, adds the requested resource to a catalogue. Over time, a consolidated list of resources required by a guest environment or client operating system may be compiled. The consolidated list may comprise the input to a dynamic table system, which can be used by the virtual machine manager to determine whether a specific resource request should be allowed or refused.

The virtual machine manager 204 can access dynamic tables for determining whether to read files associated with the host environment 102 or the guest environment 202. The dynamic tables can comprise tables for storing names of operating system resources, where the names are categorized into a suitable taxonomy for the operating system in use. The processor of the host computer 200 can process a resource query such as a resource request or a directory query according to the dynamic tables.

The dynamic tables may contain one or more lists of resources associated with the operating system 104. In some embodiments, the list of resources corresponds to files stored on the host memory or the guest memory (further described in FIG. 3). In some embodiments, the dynamic tables comprise a File Exception Table (FET) and a File Inclusion Table (FIT). The FET may indicate that a resource should be read for the host environment (from host memory further discussed in FIG. 3), and the FIT may indicate that a resource should be read for the guest environment 202 (from guest memory further discussed in FIG. 3).

Figure 3:
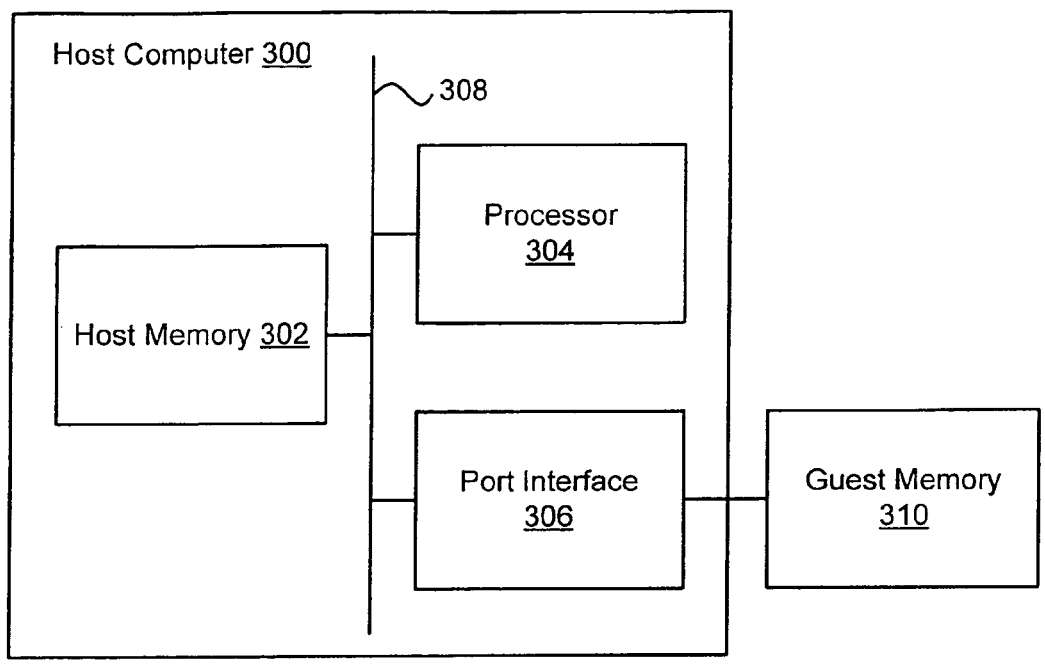
FIG. 3 is a block diagram of a host computer in an exemplary implementation of the invention.

FIG. 3 is a block diagram of the components of the host computer 200, according to various embodiments of the present invention. The host computer 200 may be communicatively coupled to a guest memory 310 via the port interface 306. The bus 308 couples the host memory 302, the processor 304, and the port interface 306. In some embodiments, the host computer 200 comprises a personal computer. The host memory 302 can store files, applications, and resources in a memory such as a hard disk or RAM.

The port interface 306 allows for connections and data exchange with peripheral components (e.g., guest memory 310). Examples of peripheral components that may be connected to the host computer 200 using the port interface 306 include memory devices, such as flash memory, storage devices, USB drives, hard drives, CD drives, and DVD drives. The port interface 306 may comprise, for example, a Universal Serial Bus (USB) port. In exemplary embodiments, the guest memory 310 is portable and may be used within many host computers 300.

In various embodiments of the present invention, the guest memory 310 includes all the required data for setting up one or more guest environments 202 (FIG. 2), including various guest resources and/or a virtual machine manager 204 (FIG. 2). Once connected to the host computer 200 using the port interface 306, software present in the guest memory 308 may be activated to install and execute the guest environment 202. Some embodiments install the virtual machine manager 204 in host memory 302. In some embodiments, the virtual machine manager 204, remains in guest memory 308.

The guest memory 310 may additionally comprise dynamic tables for determining whether to read files associated with the guest memory 310 or the host memory 302. The dynamic tables may contain a list of resources associated with the operating system 104 (FIG. 2). In some embodiments, the list of resources corresponds to files stored on the memory of the host computer 200 or the guest memory 310. In some embodiments, the dynamic tables comprise the FET and FIT tables. The FET may indicate that a resource should be read from the host memory 302, and the FIT may indicate that a resource should be read from the guest memory 310.

The dynamic table entries indicate a file name having a standard hierarchical file structure in a table. For example, the file name "\WINDOWS\TEMP" may appear in the FIT and the file name "\WINDOWS" may appear in the FET. In this example, a file in "\WINDOWS\TEMP" will be read from the guest memory 310 but a file in "\WINDOWS\SYSTEM" will be read from the host memory 302. (The process of matching old operating system resources to new operating system resources is further discussed in U.S. patent application Ser. No. 11/525,727, entitled "Dynamic Table Configuration in a Virtual Machine", filed Sep. 22, 2006, which is hereby incorporated by reference.)

Figure 4:
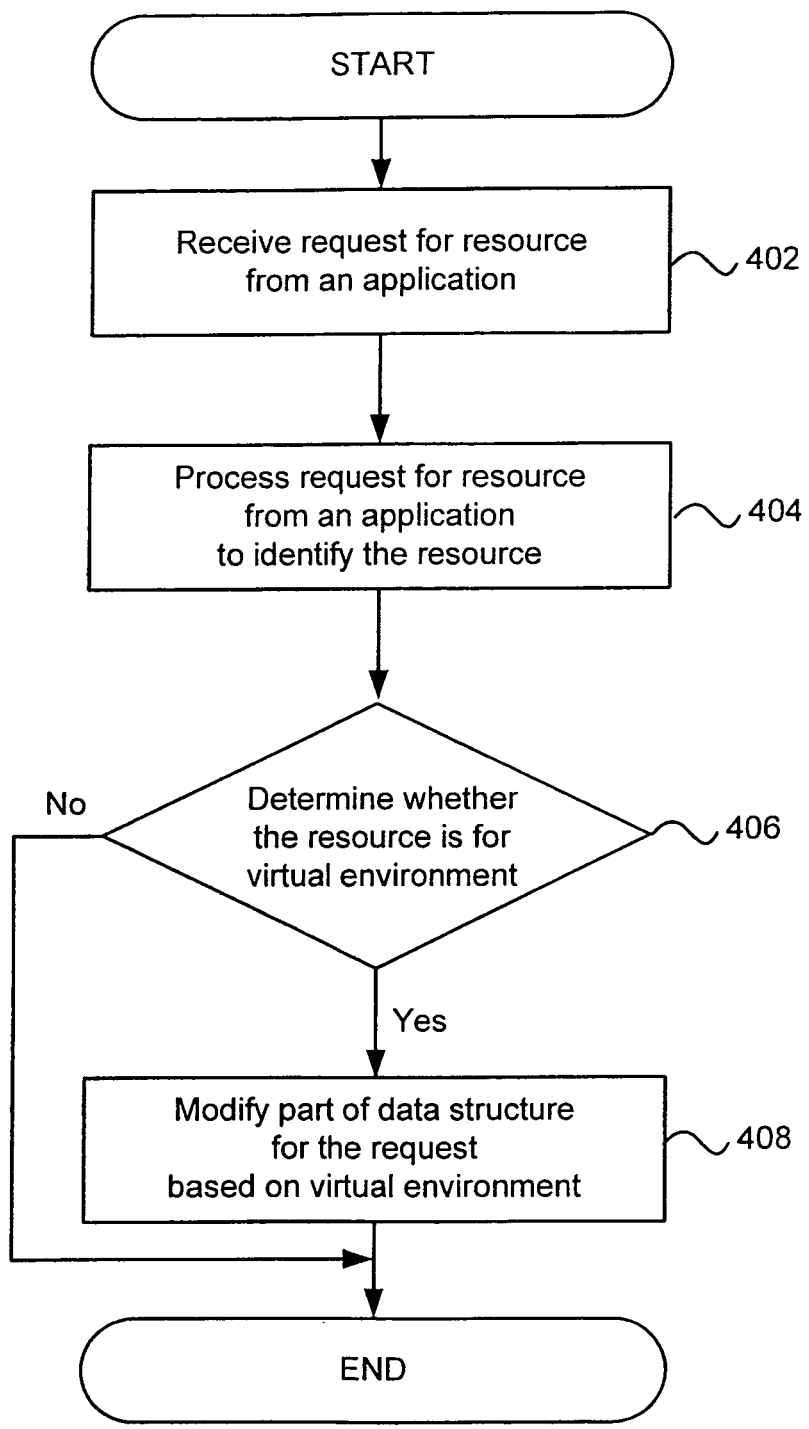
FIG. 4 is a flow chart of a process for intelligent resource management for a virtual machine in an exemplary implementation of the invention.

FIG. 4 is a flow chart of an exemplary, general process for intelligent resource management for the virtual machine. In step 402, the virtual machine manager 204 (FIG. 2) receives a request for a resource from an application. The request may comprise a call (i.e., an invocation) to an application program interface. The application program interface may be provided by the operating system 104 (FIG. 2). In one example, the request is to read a file and output the contents to a specific memory (i.e., RAM) location. The request comprises the location of the resource.

In step 404, the virtual machine manager 204 processes the request to identify the requested resource. In exemplary embodiments, the virtual machine manager 204 intercepts the application program interface call (i.e., the request) generated by an application from either the host environment 102 or the guest environment 202 (FIG. 2). The virtual machine manager 204 then identifies the resource within the application program interface call.

In step 406, the virtual machine manager 204 determines whether the requested resource is for the guest environment 202. In exemplary embodiments, the virtual machine manager 204 comprises a dynamic table. In some embodiments, the dynamic tables comprises tables of files stored in the host memory 302 (e.g., the FET table) and in the guest memory 310 (e.g., the FIT table.)

The virtual machine manager 204 may determine a FET weight and a FIT weight with respect to a resource name to determine whether the requested resource is for the guest environment 202. In one example, the FIT weight is less than the FET weight, and, as a result, the virtual machine manager 204 may determine that the requested resource is for or from the guest environment 204. As a result, the resource may be read from the guest memory 310 and namespace virtualization will be necessary in step 406. The dynamic table is further discussed in U.S. nonprovisional patent application Ser. No. 11/525,727, entitled "Dynamic Table Configuration in a Virtual Machine", filed Sep. 22, 2006.

In exemplary embodiments, the virtual machine manager 204 identifies the environment (e.g., guest environment 202 or the host environment 102) application that sent the request and then determines that the requested resource is for the identified environment. The virtual machine manager 204 may identify the environment of the running application or check a registry (e.g., operating system registry and/or guest memory 310 registry) to determine the environment for the requested resource. If the requested resource is for the host environment 102, then the process ends.

If the requested resource is for the guest environment 202, then the virtual machine manager 204 modifies a part of a data structure for the request based on the guest environment 202 in step 408. In one example, the file to be read is determined to be for the guest environment 202. Although the original request may identify the location of the file to be read as being located on the "c" drive at the "/windows" directory, the data structure may be modified such that the request identifies the location of the file as the "p" drive at the same directory (i.e., "/windows".) The "p" drive may identify the guest memory 310 or a mounted volume contained within the guest memory 310.

In exemplary embodiments, the dynamic table comprises virtualization data to assist the virtual machine manager 204 to modify the request. Virtualization data is data that comprises locations and modifications to be used if the virtual machine manager 204 determines namespace virtualization is necessary. In one example, the dynamic table comprises virtualization data that identifies all files to be pulled from the guest memory 310 as pulling from the "p" drive.

In other embodiments, the virtual machine manager 204 scans a registry to determine the appropriate modification. The registry may be an operating system 104 registry or a guest memory 310 registry. In one example, the guest memory 310 is operationally coupled with the host computer 300. Upon activation, the guest memory 310 may configure and load a registry into the host computer 300. The registry is further discussed in U.S. nonprovisional patent application Ser. No. 11/525,726, entitled "Hot Pluggable Virtual Machine", filed Sep. 22, 2006.

The operating system 104 itself needs no modification to process resource requests from the host environment 102 and the guest environment 202. In exemplary embodiments, the operating system 104 receives and processes the "unmodified" resource requests from the host environment 102 as well as "modified" resource requests from the guest environment 202 without interruption. The "unmodified" resource requests are those that do not undergo namespace virtualization. "Modified" resource requests from the guest environment 202 (or for the guest environment 202) are namespace virtualized. The locations of the resources or the output of function calls are simply redirected as a result of the namespace virtualization. By modifying the data structure of requests, virtual machines may run on a host computer 200 without the complexity of duplicating functions of the operating system 104 or creating new application programming interfaces.

Although examples of namespace virtualization may discuss location of resources (such as files) or the output of functions, those skilled in the art will appreciate that the resource requests may be modified in many ways such that the operating system 104 can process requests from the host environment 102 and the guest environment 202. In one example, the guest environment 202 comprises an application configured to operate on a different operating system than the operating system 104. The virtual machine manager 204 may alter resource requests configured to work with one application programming interface of the virtualized environment (e.g., Linux) to translate the resource requests such that a Windows application programming interface will recognize the request.

Figure 5:
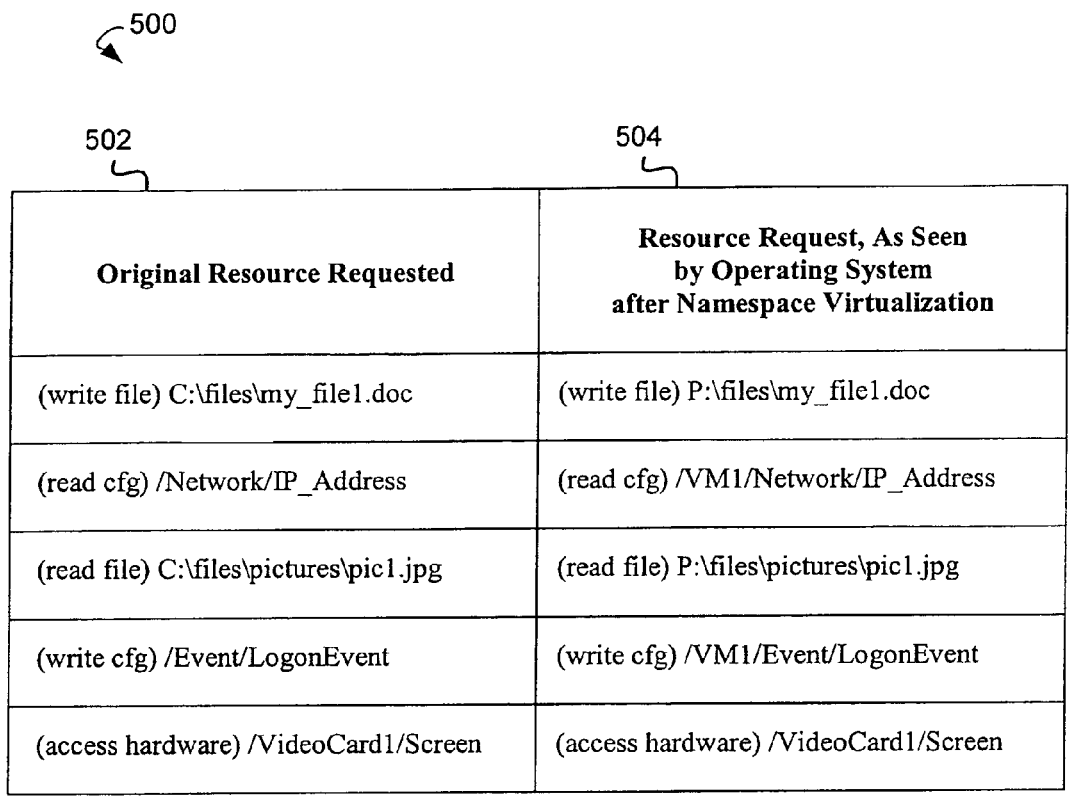
FIG. 5 is a table showing the effects of namespace virtualization in an exemplary implementation of the invention.

FIG. 5 is a table 500 showing the effects of namespace virtualization in an exemplary implementation of the invention. Resource requests from a guest application within the guest environment 202 (FIG. 2) are converted via namespace virtualization for the operating system 104 (FIG. 1).

A resource request in its original form in column 502 is found by the virtual machine manager 204 (FIG. 2) to be for the guest environment 202. Accordingly, the virtual machine manager 204 performs the following translations to forms identified in column 504. In this example, the names (i.e., locations) of files identifying the "C" drive are translated so that the names of the files identify the "P" drive. Configuration-related requests are translated to include the prefix name "/VM1" to reroute the operation of the request. After this namespace virtualization process, the operating system 104 (FIG. 2) sees the resource request in the virtualized form 504 and executes the requests accordingly.

In some embodiments, hardware resources remain unchanged. In other embodiments, hardware resource requests by the guest environment 202 may be for emulated hardware. As a result, the hardware resource request may be modified to identify the emulated hardware and/or the appropriate driver.

The translations made by the virtual machine manager 204 performing namespace virtualization shown in FIG. 5 are simple examples. Namespace virtualization may comprise any virtualization rules, including these examples and much more complex translations. Namespace virtualization may be performed on the following nonexhaustive list of examples: names of registry values used by a operating system to store system and application configuration information, kernel objects used by an operating system 104 to represent or manage a resource (such as events, semaphores, names pipes, mutexes or mutants, mailslots, ports, sections of shared memory segments, timers, jobs, symbolic link objects, and so forth), application program interfaces for file management, and names that include wildcards.

The virtual machine manager 204 may perform namespace virtualization in various ways. In some embodiments, the virtual machine manager 204 performs rule-based namespace virtualization using a set of rule tables in combination or within the dynamic table. In some embodiments, separate rule tables are changed by the operating system 104 during execution thereby allowing adaptation to the changing needs of the guest environment 202. In one example, the virtual machine manager 204 creates a separate rule and populates a rule table for each called resource from the guest environment 202. Upon a resource request, the virtual machine manager 204 may check a rules table. If the resource is identified within the rules table, the virtual machine manager 204 may perform namespace virtualization. In other embodiments, rules are formed by the dynamic tables.

In various embodiments, rules can be formed to apply to namespace virtualization. In one example, a rule may be formed that whenever a resource is called by an application within the guest environment 202, the name of the resource must be modified to identify a resource within guest memory 310 (e.g., from c:/windows to p:/windows.) These rules could function to limit processing time to determine the proper modification during namespace virtualization. Other rules may automatically direct hardware calls from the guest environment 202 to virtualized or emulated counterparts. Those skilled in the art will appreciate that there may be many ways to create rules for namespace virtualization.

Figure 6:
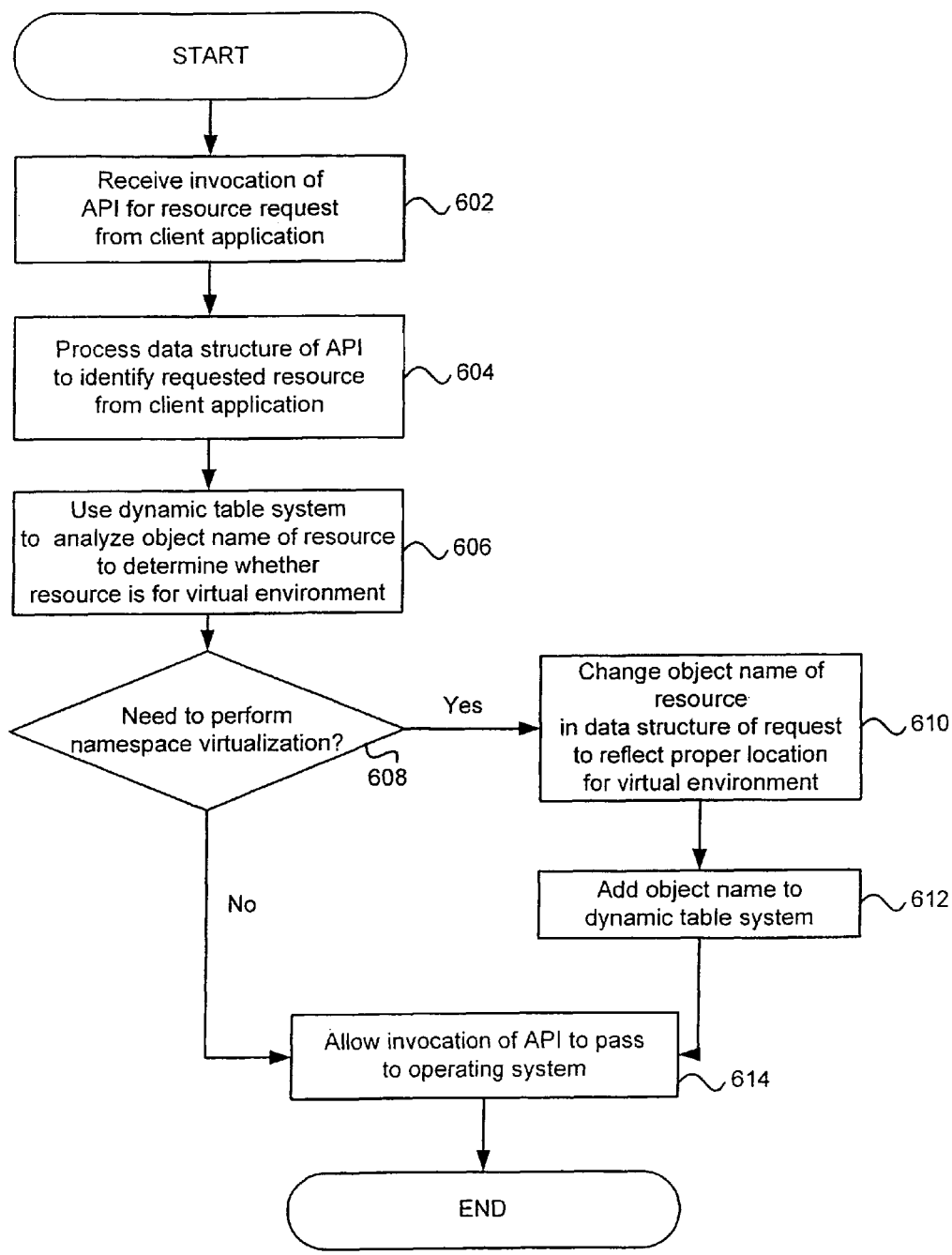
FIG. 6 is a flow chart of another process for intelligent resource management for a virtual machine, in an exemplary implementation of the invention.

FIG. 6 is a flow chart of another process for intelligent resource management for a virtual machine, in an exemplary implementation of the invention. In step 602, the virtual machine manager 204 (FIG. 2) receives an invocation of an application program interface for a resource from an application. The virtual machine manager 204 effectively intercepts the resource request from the application program requesting the resource, before the operating system 104 (FIG. 1) receives the request. In step 604, the virtual machine manager 204 processes the data structure of the application program interface to identify the requested resource.

In step 606, the virtual machine manager 204 uses a dynamic table to analyze the request to identify the object name of the resource to determine whether the resource is for the guest environment 202. The dynamic table may be within the guest memory 310 (FIG. 3) or the host memory 302 (FIG. 3). In other embodiments, the virtual machine manager 204 may use a registry to identify the object name of the resource.

In step 608, the virtual machine manager 204 determines if the namespace virtualization is to be performed. If the resource is not for the guest environment 202, then the virtual machine manager 204 allows the invocation of the application programming interface to pass to the operating system in step 614 without modification. If the virtual machine manager 204 determines that namespace virtualization should be performed, the virtual machine manager 204 changes the object name of the resource in the data structure of the request to reflect the proper location of the resource, input, and/or output for the guest environment 202 in step 610.

In step 612, the virtual machine manager 204 adds the object name to the dynamic table. In some embodiments, the virtual machine manager 204 determines if the dynamic table identifies the resource, the object name, and/or any modifications if the object name is to be modified. If the resource, object name, and/or any modifications is missing or incorrect, the virtual machine manager 204 may add the information into the dynamic table. The virtual machine manager 204 may then allow the modified invocation of the application processing interface to pass to the operating system 104.

In exemplary embodiments, the virtual machine manager 204 intercepts the resource request sent from an application to the operating system 104. The virtual machine manager 204 processes the resource request to determine the object name of the resource. The virtual machine manager 204 may then access the dynamic table and determine the whether the resource is for the guest environment 202 based on a process involving weighing on a FIT and FET table (further discussed in FIG. 4.) If the resource is for the guest environment 202, the virtual machine manager 204 may scan the dynamic table for appropriate modifications. If modifications are present within the table, the virtual machine manager 204 may make alterations to the object name of the resource based on the modifications identified within the dynamic table, or confirm the modifications prior to making the changes to the object name (e.g., comparing the modifications within the dynamic table to a registry.)

If the resource is for the guest environment 202, then at step 608, the virtual machine manager 204 determines that it must perform namespace virtualization of the object name, and proceeds to step 610. At step 610 the virtual machine manager 204 changes the object name of the resource in the data structure of the application program interface for the resource to reflect the proper association of the resource with the guest environment 202. In some embodiments, the virtual machine manager 204 changes the location of the output of the resource request. At step 612, the virtual machine manager 204 adds the object name to the dynamic table system.

At step 614, the virtual machine manager 204 allows the invocation of an application program interface to pass to the operating system 104. Thus, if the application program interface pertained to a request for a resource for the guest environment 202, at step 614 the operating system 104 sees a request that is different from the original request made by the application. If the resource is not for the guest environment 202, then at step 608, the virtual machine manager 204 proceeds directly to step 614.

The embodiments and examples discussed herein of virtualization may allow for the portability of one or more guest environments 202 from one host computer 200 to another. For example, the virtual machine can reside within a guest memory 310 (e.g., USB storage device) that may be coupled with different host computers. The virtual machine can provide guest environment 202 capabilities to a variety of host computers 200, reconfiguring resources based on the presence or absence of software and peripherals on a particular host computer 200. As a result little or no modifications to the host computer may need to be made. Further, rebooting may not be required.

In exemplary embodiments, virtual management software or files do not need to be installed on the host computer. In one example, files are not needed to be copied from the guest memory 310 to the host computer 200 since each command for the files/resources within guest memory 310 may be modified so that the operating system 104 addresses the correct file/resource within the guest memory 310. As a result, the boot time for the virtualization software on the guest memory 310 may be very short.

While various embodiments have been described above, it should be understood that they have been presented by way of example only, and not limitation. For example, any of the elements associated with the intelligent resource management for a virtual machine may employ any of the desired functionality set forth hereinabove. Thus, the breadth and scope of a preferred embodiment should not be limited by any of the above-described exemplary embodiments.

What is claimed is:

1. A method comprising:
receiving, from an application running in a guest environment, a request for a resource stored in one of a host memory and a guest memory, wherein the request includes a data structure having an object name and an indication that the resource is to be read from the host memory;
processing the request to identify the resource in the host memory;
calculating a first dynamic table weight for the data structure based on a first dynamic table indicative of resources stored in the host memory by querying the first dynamic table for the resource;

calculating a second dynamic table weight for the data structure based on a second dynamic table indicative of resources stored in the guest memory by querying the second dynamic table for the resource;

determining whether the request for the resource is a request for resource stored in the guest memory based on a comparison of the first dynamic table weight and the second dynamic table weight; and in response to determining that the request is a request for the resource stored in the guest memory, modifying the data structure of the request to indicate that the resource is to be read from the guest memory by modifying the object name identifying where the resource is located from the host memory to the guest memory.

2. The method of claim 1, wherein receiving the request for the resource comprises receiving a request for an invocation to an application programming interface.

3. The method of claim 1, wherein the determining comprises identifying the resource and the guest memory using a table.

4. The method of claim 3, further comprising updating the table based on the modified data structure.

5. The method of claim 1, wherein the determining comprises identifying the resource and the guest memory using a rule.

6. The method of claim 1, further comprising transmitting the request to an operating system.

7. A non-transitory computer readable storage medium having a computer program embodied thereon, the computer program configured to, when executed by a processor in a computing system, cause the computing system at least to:

receive, from an application running in a guest environment, a request for a resource stored in one of a host memory and a guest memory, wherein the request includes a data structure having an object name and an indication that the resource is to be read from the host memory;

process the request to identify the resource in the host memory;

calculate a first dynamic table weight for the data structure based on a first dynamic table indicative of resources stored in the host memory by querying the first dynamic table for the resource;

calculate a second dynamic table weight for the data structure based on a second dynamic table indicative of resources stored in the guest memory by querying the second dynamic table for the resource;

determine whether the request for the resource is a request for the resource stored in the guest memory based on a comparison of the first dynamic table weight and the second dynamic table weight; and in response to determining that the request is a request for the resource stored in the guest memory, modify the data structure: of the request to indicate that the resource is to be read from the guest memory by modifying the object name identifying where the resource is located from the host memory to the guest memory.

8. The non-transitory computer readable storage medium of claim 7, wherein the determining comprises identifying the resource and the guest memory using a table.

9. The non-transitory computer readable storage medium of claim 8, wherein the computer program is further configured to, when executed by the processor in the computing system, cause the computing system to update the table based on the modified data structure.

10. The non-transitory computer readable storage medium of claim 8, wherein receiving the request for the resource comprises receiving a request for an invocation to an application programming interface.

11. The non-transitory computer readable storage medium of claim 8, further comprising transmitting the request to an operating system.

12. The non-transitory computer readable storage medium of claim 7, wherein the determining comprises identifying the resource and the guest memory using a rule.

13. A system comprising:

a processor; and memory storing computer readable instructions that, when executed by the processor, cause the system to:

receive, from an application running in a guest environment, a request for a resource stored in one of a host memory and a guest memory, wherein the request includes a data structure having an object name and an indication that the resource is to be read from the host memory;

process the request to identify the resource in the host memory;

calculate a first dynamic table weight for the data structure based on a first dynamic table indicative of resources stored in the host memory by querying the first dynamic table for the resource;

calculating a second dynamic table weight for the data structure based on a second dynamic table indicative of resources stored in the guest memory by querying the second dynamic table for the resource;

determine whether the request for the resource is a request for the resource stored in the guest memory based on a comparison of the first dynamic table weight and the second dynamic table weight; and in response to determining that the request is a request for the resource stored in the guest memory, modify the data structure of the request to indicate that the resource is to be read from the guest memory by modifying the object name identifying where the resource is located from the host memory to the guest memory.

14. The system of claim 13, wherein the memory further stores computer readable instructions that, when executed by the processor, cause the system to use a table to identify the resource and the guest memory.

15. The system of claim 14, wherein the memory further stores computer readable instructions that, when executed by the processor, cause the system to update the table based on the modified data structure.

16. The system of claim 13, wherein the memory further stores computer readable instructions that, when executed by the processor, cause the system to use a rule to identify the resource and the guest memory.

17. The system of claim 13, wherein the request for the resource comprises a request for an invocation to an application programming interface.

18. The system of claim 13, wherein the memory further stores computer readable instructions that, when executed by the processor, cause the system to transmit the request to an operating system.

* * * * *

UNITED STATES PATENT AND TRADEMARK OFFICE
CERTIFICATE OF CORRECTION

PATENT NO. : 8,505,006 B1  Page 1 of 1
APPLICATION NO. : 11/525888
DATED : August 6, 2013
INVENTOR(S) : Michael K. Larkin It is certified that error appears in the above-identified patent and that said Letters Patent is hereby corrected as shown below:

On the Title Page; Under the Assignee Section:
        Please delete "Ringcube Technologies, Inc." and insert --Citrix Systems, Inc.--

Signed and Sealed this
Eleventh Day of March, 2014

Michelle K. Lee
*Deputy Director of the United States Patent and Trademark Office*